US006438543B1

(12) United States Patent
Kazi et al.

(10) Patent No.: US 6,438,543 B1
(45) Date of Patent: *Aug. 20, 2002

(54) SYSTEM AND METHOD FOR CROSS-DOCUMENT COREFERENCE

(75) Inventors: Zunaid H. Kazi, Stamford, CT (US); Yael Ravin, Mount Kisco, NY (US)

(73) Assignee: International Business Machines Corporation, armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/335,276

(22) Filed: Jun. 17, 1999

(51) Int. Cl.[7] .......................... G06F 17/30; G06F 15/16
(52) U.S. Cl. ............................. 707/5; 707/104.1; 707/7
(58) Field of Search ............................ 707/3–10, 104, 707/100–102, 1, 532, 536; 709/236; 716/5, 2; 345/762; 704/9–11, 2, 8

(56) References Cited

U.S. PATENT DOCUMENTS

| 5,339,392 | A | * | 8/1994 | Risberg et al. | ............. 345/762 |
|---|---|---|---|---|---|
| 5,819,260 | A | * | 10/1998 | Lu et al. | ......................... 707/3 |
| 5,819,265 | A | | 10/1998 | Ravin et al. | .................... 707/5 |
| 5,832,480 | A | | 11/1998 | Byrd, Jr. et al. | ................ 707/5 |
| 6,052,693 | A | * | 4/2000 | Smith et al. | ................. 707/104 |
| 6,289,342 | B1 | * | 9/2001 | Lawrence et al. | ............. 707/7 |

OTHER PUBLICATIONS

Bagga et al., "Entity–Based Cross–Document Coreferencing Using the Vector Space Model", Proceedings of Coling–ACL 1998, pp. 79–85.

* cited by examiner

*Primary Examiner*—Safet Metjahic
*Assistant Examiner*—Te Yu Chen
(74) *Attorney, Agent, or Firm*—F. Chau & Associates, LLP; Louis J. Percello, Esq.

(57) ABSTRACT

A method for coreferencing a plurality of documents includes the steps of providing a name list for names extracted from documents to be coreferenced upon entry of a query by a user, sorting the names of the list of names into mergable names and exclusive sets, comparing contexts of the mergable names against the exclusive sets to merge the mergable names to the exclusive sets exceeding a predetermined threshold to form an aggregated cross-document name list and referencing the aggregated cross-document name list to provide the user with coreferenced names across the plurality of documents which refer to a same entity in accordance with the query.

25 Claims, 5 Drawing Sheets

FIG. 5

SYSTEM AND METHOD FOR CROSS-DOCUMENT COREFERENCE

BACKGROUND OF THE INVENTION

1. Field of the Invention

The present invention relates to computerized documents, and more particularly to a method for coreferencing two or more names which refer to a same entity.

2. Description of the Related Art

The need to identify and extract important concepts in on-line text documents is commonly acknowledged by researchers and practitioners in the fields of information retrieval, knowledge management and digital libraries. It is a necessary first step towards achieving a reduction in the ever-increasing volumes of on-line text.

There are several challenging aspects to the identification of names: identifying the text strings (words or phrases) that express names; relating names to the entities discussed in the document; and relating named entities across documents. In relating names to entities, the main difficulty is the many-to-many mapping between them. A single entity can be referred to by several name variants: FORD MOTOR COMPANY, FORD MOTOR CO., or simply FORD. A single variant often names several entities: Ford refers to the car company, but also to a place (Ford, Michigan) as well as to several people: President Gerald Ford, Senator Wendell Ford, and others. Context is crucial in identifying the intended mapping. A document usually defines a single context, in which it is quite unlikely to find several entities corresponding to the same variant. For example, if the document talks about the car company, it is unlikely to also discuss Gerald Ford. Thus, within documents, the problem is usually reduced to a many-to-one mapping between several variants and a single entity. In the few cases where multiple entities in the document may potentially share a name variant, the problem is addressed by careful editors, who refrain from using ambiguous variants. If Henry Ford, for example, is mentioned in the context of the car company, he will most likely be referred to by the unambiguous Mr. Ford.

Much recent work has been devoted to the identification of names within documents and to linking names to entities within the document. Several research groups, as well as a few commercial software packages, have developed name identification technology. However, few have investigated named entities across documents. In a collection of documents, there are multiple contexts; variants may or may not refer to the same entity; and ambiguity is a much greater problem. Cross-document coreference was briefly considered as a task for the Sixth Message Understanding Conference but then discarded as being too difficult (see, Tipster Text Program. *Sixth Message Understanding Conference* (MUC-6).

Recently, Bagga and Baldwin, in "Entity-based cross-document coreferencing using the vector space model," Proceedings of COLING-ACL 1998, pages 79–85, proposed a method for determining whether two names (mostly of people) or events refer to the same entity by measuring the similarity between the document contexts in which they appear. The approach of Bagga and Baldwin is to compare every two names which share a substring in common, for example, "President Clinton" and "Clinton, Ohio," to determine whether they refer to the same entity. This approach suffers from a potentially n-squared number of comparisons, which is a very costly process and cannot scale to process the size of current, and most certainly future, document collections. In addition, Bagga and Baldwin's approach does not address another cross-document problem of names that are potentially combinations of two or more names, which should be separated into their components, such as "President Clinton of the United States."

Therefore, a need exists for a coreferencing system and method which can be employed across a plurality of documents.

SUMMARY OF THE INVENTION

A method for coreferencing a plurality of documents, which may be implemented by a program storage device readable by machine, tangibly embodying a program of instructions executable by the machine to perform method steps, the method steps include providing a name list for names extracted from documents to be coreferenced prior to or upon entry of a query by a user, sorting the names of the list of names into mergable names and exclusive sets, comparing contexts of the mergable names against the exclusive sets to merge the mergable names to the exclusive sets exceeding a predetermined threshold to form an aggregated cross-document name list and referencing the aggregated cross-document name list to provide the user with coreferenced names across the plurality of documents which refer to a same entity in accordance with the query.

A method for searching a plurality of documents for an entity having a plurality of variant names, which may be implemented by a program storage device readable by machine, tangibly embodying a program of instructions executable by the machine to perform method steps, the method steps include providing a name list for names extracted from documents to be coreferenced prior to or upon entry of a search query by a user including a name of the entity, sorting the names of the list of names into mergable names and exclusive sets, comparing contexts of the mergable names against the exclusive sets to merge the mergable names to the exclusive sets exceeding a predetermined threshold to form an aggregated cross-document name list, the aggregated cross-document name list including a list of variant names for the entity and providing a list of documents to the user referencing the variant names and the name of the entity used for the search query.

In alternate methods, which may be implemented by the program storage device, the step of extracting the name list from a collection of documents by employing a name extractor may be included. The step of normalizing the name list to provide the names in the name list in a predetermined format may also be included. The step of splitting the names of the name list into component names based on evidence derived from the names may also be included. The evidence derived from the names may include one of prefixes, suffixes, titles and information indicating one of a place, organization and a person. The step of merging identical names to reduce the name list may be included. The step of sorting the name list into a person list and a place list may also be included. The step of comparing contexts of the mergable names against the exclusive sets may include the steps of mapping all of the mergable names to each of the exclusive sets to provide matches above the predetermined threshold.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides a coreferencing system and method for to determine if two or more references corefer to a same name or entity. The present invention operates, in contrast to the approach in of Bragga and Baldwin, cited above, and capitalizes on careful intra-document name recognition developed for use with the invention. To minimize the processing cost involved in comparing contexts, the present invention defines compatible names, i.e., groups of names that are good candidates for coreference, and compares their internal structures, to decide whether they corefer. Only then, if needed, context comparisons are performed, using a context thesaurus which has been developed independently by the inventors, as part of an application to assist users in querying a collection of documents.

To analyze and process information in text a name identification module is employed for name discovery. The process for name discovery is illustrated using the following excerpt:

... The professional conduct of lawyers in other jurisdictions is guided by American Bar Association rules ... The ABA has reserved ... But John Smith, a partner at Smith and Jones who took the lead in ... "The practice of law in Washington is very different from what it is in Dubuque," ... Mr. Smith of Smith & Jones ...

Before the text is processed by Nominator, it is analyzed into tokens—words, tags, and punctuation elements. Nominator forms a candidate name list by scanning the tokenized document and collecting sequences of capitalized tokens as well as some special lower-case ones. The list of candidate names extracted from the sample document includes:

American Bar Association

John Smith

Smith & Jones

ABA

Washington

Dubuque

Mr. Smith of Smith & Jones Each candidate name is examined for the presence of conjunctions, prepositions or possessives ('s). These may indicate points at which the candidate name should be split into component names. A set of heuristics is applied to each candidate name, to split it into as many smaller independent names as are found in it. Mr. Smith of Smith & Jones is split into Mr.Smith and Smith & Jones. Without recourse to semantics or world knowledge, sufficient evidence may not always be present. In such cases, it is preferred to err on the conservative side and not split, so as to not lose any information. This is discussed later for the splitting of these conjoined "names" at the collection level.

As a last step in name identification within the document, Nominator links all variants referring to the same entity. For example ABA is linked to American Bar Association as a possible abbreviation. Each linked group is categorized by an entity type and assigned a canonical string as identifier. The result for the sample text is illustratively shown below. Each canonical string may be followed by its entity type (for example, PL for PLACE; PR for PERSON, etc.) and the variant names linked to it.

American Bar Association [ORG]: ABA

Smith & Jones [ORG]

Washington [PL]

Dubuque [PL]

John Smith [PR]: Mr. Smith

In a typical document, a single entity may be referred to by many name variants, which differ in their degree of potential ambiguity. To disambiguate highly ambiguous variants, the highly ambiguous variants are linked to unambiguous variants occurring within the same document. Nominator cycles through the list of names, identifying 'anchors', or variant names that unambiguously refer to certain entity types. When an anchor is identified, the list of name candidates is scanned for ambiguous variants that could refer to the same entity. The ambiguous variants are grouped together with the anchor in an equivalence group.

A few simple indicators may determine the entity type of a name, such as Mr. for a person or Inc. for an organization. More commonly, however, several pieces of positive and negative evidence may be accumulated to make this judgment. A set of obligatory and optional components for each entity type are defined. For a human name, these components include a professional title (e.g., Attorney General), a personal title (e.g., Dr.), a first name, and others. The various components are inspected. Some combinations may result in a high negative score, i.e., highly confident that this cannot be a person name. For example, if the name lacks a personal title and a first name, and its last name is marked as an organization word (e.g., Department), it will receive a high negative score. This is the case with Justice Department or Frank Sinatra Building. The same combination, but with a last name that is not a listed organization word, results in a low positive score, as for Justice Johnson or Frank Sinatra.

Names with low or zero scores are first tested as possible variants of names with high positive scores. However, if the names are incompatible with any variants, the names are assigned a weak entity type. Thus, in the absence of any other evidence in the document, Beverly Hills or Susan Hills will be classified as PR? (PR? is preferred to PL? as it tends to be the correct choice most of the time.)

The choice of a canonical string as the identifier for equivalence groups within each document is employed for later merging across documents. The document-based canonical string should be explicit enough to distinguish between different named entities, yet normalized enough to aggregate all mentions of the same entity across documents. Canonical strings of human names are comprised of the following parts, if found: first name, middle name, last name, and suffix (e.g., Jr.). Professional or personal titles and nicknames are not included as these are less permanent features of people's names and may vary across documents. Identical canonical strings with the same entity type (e.g., PR) are merged across documents. For example, in a particular document, Alan Greenspan has the following variants across documents—Federal Reserve Chairman Alan Greenspan, Mr. Greenspan, Greenspan, Federal Reserve Board Chairman Alan Greenspan, Fed Chairman Alan Greenspan—but a single canonical string—Alan Greenspan.

An aggregation of variant names in accordance with the invention also merges near-identical canonical strings: the invention normalizes over hyphens, slashes and spaces to merge canonical names such as Allied-Signal and Allied Signal, PC-TV and PC/TV. The invention normalizes over "empty" words (People's Liberation Army and People Liberation Army; Leadership Conference on Civil Rights and Leadership Conference of Civil Rights). The present invention merges identical stemmed words of sufficient length (Communications Decency Act and Communication Decency Act). Normalization is not allowed for people's names, to avoid combining names such as Smithberg and Smithburg.

Merging of identical names with different entity types is controlled by a table of aggregateable types. For example, PR? can merge with PL, as in Beverly Hills [PR?] and Beverly Hills [PL]. But ORG and PL cannot merge, so Boston [ORG] does not merge with Boston [PL]. As a further precaution, no aggregation occurs if the merge is ambiguous, that is, if a canonical name could potentially merge with more than one other canonical name. For example, President Clinton could be merged with Bill Clinton, Chelsea Clinton or Hillary Rodham Clinton.

To prevent erroneous aggregation of different entities, the present invention does not simply aggregate over different canonical strings. For example, the canonical place New York(city or state) is kept distinct from the canonical New York City and New York State. Similarly, with human names: Jerry O. Williams in one document is separate from Jerry Williams in another; or, more significantly, Jerry Lewis from one document is distinct from Jerry Lee Lewis from another. Merging such names is decided on the basis of context comparisons as explained below.

The present invention addresses among other things the following obstacles:

1) Failure to merge—often, particularly famous people or places, may be referred to by different canonical strings in different documents. Consider, for example, some of the canonical strings identified for President Clinton in a collection of 2330 documents:

Bill Clinton [PR]

Mr. Clinton [PR]

President Clinton [PR]

William Jefferson Clinton [PR]

Clinton [uncategorized]

If a decision not to merge under ambiguity (as mentioned above) is employed, the final list of names includes many names that should have been further aggregated.

2) Failure to split—there is insufficient intra-document evidence for splitting "names" that are combinations of two or more component names, such as ABC, paramount and Disney, or B. Brown of Dallas County Judicial District Court. Note that splitting is complex: sometimes even humans are undecided, for combinations such as Chicago Consulting Group in San Francisco.

For the "splitting" problem first described in item 2 above. The heuristics for splitting names within a document may fail to address two kinds of combined names. First, there is a residue of names including and, such as Smith and Jones, in which the "and" may or may not be part of the organization name. The cross-document method of the present invention to handle these issues iterates over the name string, breaks it into component strings at commas and "and"s, and verifies that each component corresponds to an independently existing canonical string. If all do, the name is split. At the collection level, there are more canonical strings available for this verification. If the name is split, the cross document statistics are repaired by folding the occurrence statistics of the combined form with those of each of the parts. On the collection level, strings like AT&T WIRELESS (trademark of AT&T) and Smith Personal Communications are split since there may not be enough evidence within the document.

More complex is the case of organization names of the form of Y or X in Y where Y is a place, such as Cat News Channel in New York City or Jones Securities in Shanghai The intra-document heuristic that splits names if their components occur on their own within the document is not appropriate here: the short form may be licensed in the document only because the full form serves as its antecedent. Evidence is needed that the short form occurs by itself in other contexts. First, these names are sorted and verified that there are no ambiguities. For example, it may appear that Union Bank of Switzerland in San Francisco is a candidate for splitting, since Union Bank of Switzerland occurs as a canonical name, but the existence of Union Bank of Switzerland in New York signals an ambiguity—there are several distinct entities whose name starts with Union Bank of Switzerland and so no splitting applies. Similar ambiguity is found with Federal District Court in New York Federal District Court in Philadelphia etc. Note that this definition of ambiguity is dependent on names found in the collection.

One approach to determining whether names corefer is the comparison of their contexts. However, since the cost of context comparison for all similar canonical strings would be prohibitively expensive, the present invention includes means of defining compatible names that are good candidates for coreference, based on knowledge obtained during intra-document processing. The method of the present invention sorts names with common substrings from least to most ambiguous. For example, PR names are sorted by identical last names. The least ambiguous ones also include a first name and middle name, followed by names including a first name and middle initial, followed by names including only a first name, a first initial and finally the names with just a last name. PR names may also carry gender information, determined either on the basis of the first name (e.g. Bill but not Jamie) or a gender prefix (e.g. Mr., but not President) of the canonical form or one of its variants. PL names are sorted by common initial strings. The least ambiguous have the pattern of <small place, big place>. By comparing the internal structure of these sorted groups, the present invention is able to divide them into mutually exclusive sets (ES), whose incomoatible features prevent any merging; and a residue of mergabie names (MN), which are compatible with some or all of the exclusive ones. For some of the mergable names, the present invention is able to stipulate coreference with the exclusive names without any further tests. For others, it is needed to compare contexts before reaching a conclusion.

To illustrate with an example, data was collected for the following sorted group for the last name Clinton (Intra-document analysis identified President Clinton once as referring to a male, since President Clinton and Mr. Clinton were merged within the document(s); another time as referring to a female, since only President Clinton and Mrs. Clinton appeared in the document(s) in question and were merged and a third President Clinton, based on documents where there was insufficient evidence for gender.). The sorted group includes:

William Jefferson Clinton [PR](ES1)

Hillary Rodham Clinton [PR] (ES2)

Larry Clinton [PR?] (ES3)

George Clinton [PR?] (ES4)

Chelsea Clinton [PR] (ES5)

The following MNs can be merged with these, based on compatibility, as indicated:

Bill Clinton [PR] MN w/ 1, nickname

Bill Clinton [PR?] MN w/ 1, nickname

Hillary Clinton [PR] MN w/ 2, first name

President Clinton [PR](m) MN w/ 1,3,4, gender

President Clinton [PR](f) MN w/ 2,5, gender

President Clinton [PR] MN w/ all ESs

Mrs. Clinton [PR] MN w/ 2,5, gender

Mr. Clinton [PR] MN w/ 1,3,4, gender

Clintons [uncategorized] MN w/ all ESs

There is too much ambiguity (or uncertainty) to stipulate coreference among the members of this sorted group. There is, however, one stipulated merge which may be applied to Bill Clinton [PR] and Bill Clinton [PR?]. The inventors have found that when the canonical string is identical, a weak entity type can safely combine with a strong one. There are many cases of PR? to PR merging, some of PL? to ORG, (e.g., Digital City), and a fair number of PL? to PR, as in Carla Hills, U.S. and Mrs. Carla Hills. Merging involving context comparison is discussed below.

A tool used for comparing contexts includes a Context Thesaurus (CT) which takes arbitrary text as input and returns a ranked list of terms that are related to the input text with respect to a given collection of documents. More specifically, the CT is used in an application which may be called Prompted Query Refinement, where it provides a ranked list of canonical strings found in the collection that are related to users' queries, out of which users may select additional terms to add to their queries. The CT works with a collection concordance, listing the collection contexts in which a particular canonical string occurs. The size of the context is parameterized, but the default is usually three sentences—the sentence where the string occurs, tne preceding and following sentence within the same paragraph. We also collect occurrence statistics for each canonical string. The CT is an ordinary information retrieval document index, for example an IBM Net-Question query system may be employed which indexes special documents, referred to as "pseudo documents." A pseudo document includes a collection of contexts in which a particular canonical string occurs. The title of the pseudo document is the canonical string itself. When a query is issued against the index, the query content is matched against the content of the pseudo documents. The result is a ranked list of pseudo documents most similar to the query. Recall that the titles of the pseudo documents are terms, or canonical strings. What is in fact returned to the user or the application looks like a ranked list of related terms. If the query itself is a single term, or a canonical string, the result is roughly a list of canonical strings in whose context the query canonical string occurs most often. As an example, the query American foreign policy in Europe issued against a CT for a specific collection of documents returns the following hit list:

American foreign policy, business interest, American people, long decision-making process, Clinton foreign policy, American policy, Women in Foreign Service, Georgetown University School of Foreign Service, alliance official, senior American, foreign corporation, conventional weapon, Central American subsidiary, Armed Services Committee, American court, foreign policy adviser, foreign policy table, Serbs in Bosnia A CT may be used to simulate the effect of context comparisons. To determine whether President Clinton in one document is the same person as Bill Clinton in another, the CT is queried with each item. In one example, the Net-Question index returns a ranked hit list of documents (in our case canonical strings) in which each item occurs. The rank of a canonical string in the resulting hit list is an interpretation of the strength of association between the queried item and the hit-list canonical string. The underlying assumption for merging the two canonical forms is the fact that if they corefer, the contexts in which they each occur should contain similar canonical strings. Hence, if the two hit lists have a sufficient number of canonical strings in common (determined empirically to exceed 50%, for example), it is asserted that the original items corefer. our cases have been identified for merging that can benefit from context comparisons after all simpler methods have been exhausted.

1) One-to-one merging occurs when there are only two names—one mergable and one exclusive. This is the case, for example, with two ORG canonical strings, where one is a substring of the other, as in AMAZON.COM$^{SM}$ and AMAZON.COM Books. Note that we cannot simply stipulate identity here because different organizations may share a common prefix. Queries are invoked to the CT using these canonical forms and aggregated if there is more than 50% overlap (this can be adjusted according to the application and/or the circumstances) in the hit lists. The query for AMAZON.COM returns: AMAZON.COM, AMAZON.COM Books, Manesh Shah, growing competition, AMAZON.COM, small number, Jeff Bezos, Kathleen Smith, online commerce, associates program, Yahoo's Web, Robert Natale, classified advertising, Jason Green, audiotapes, Internet company, larger inventory, Day One, Society of Mind, Renaissance Capital The query for AMAZON.COM Books returns:

small number, AMAZON.COM Books, audiotapes, AMAZON.COM, banned book, Manesh Shah, growing, competition, Jeff Bezos, bookstore, superstores, Kathleen Smith, online commerce, Yahoo's Web, Robert Natale, classified advertising, Jason Green, larger inventory, Internet company, Renaissance Capital, Day One Since there is an 80% match, there is more than ample evidence for merging the two names.

2) One-to-many merging occurs when there is one mergable name but several distinct exclusive ones that are compatible with it. For example, Cohen [PR] can match either Marc Cohen [PR] or William Cohen [PR].

3) A many-to-one merging occurs quite frequently. Several names of type PR, PR? or even uncategorized names share the same last name and have compatible first or middle names across documents. For example:

1: Madeleine Korbel Albright [PR]—ES

2: Madeleine K. Albright [PR]—MN

3: Madeleine Albright [PR]—MN

Querying the CT results in a 60% match between 1 and 2, a 90% match between 2 and 3, and an 80% match between 3 and 1. Again, there is sufficient evidence for merging the three names.

4) The most complex case involves a many-to-many match, as illustrated by the Clinton example mentioned above. Here are the results of the CT context matches.

ES1: William Jefferson Clinton [PR]

ES2: Hillary Rodham Clinton [PR], Hillary Clinton [PR], Mrs. Clinton [PR]

ES3: Larry Clinton [PR?]

ES4: George Clinton [PR?]

ES5: Chelsea Clinton [PR]

ES6: Bill Clinton [PR?], Bill Clinton [PR], President Clinton [PR], Mr. Clinton [PR], Clintons [uncategorized]

Notice that Bill Clinton failed to merge with William Jefferson Clinton This example suggests that failing to merge compatible names using the CT, other information can be used. For example, it can be checked if the mergable canonical string is a variant name of another name, or if there is an overlap in the variant names of the two canonical strings. Variant names of the present invention include titles and professional descriptions, such as, then—Vice President or Professor of Physics, The present invention checks for overlap in these descriptions which increases accuracy.

Figure 1:
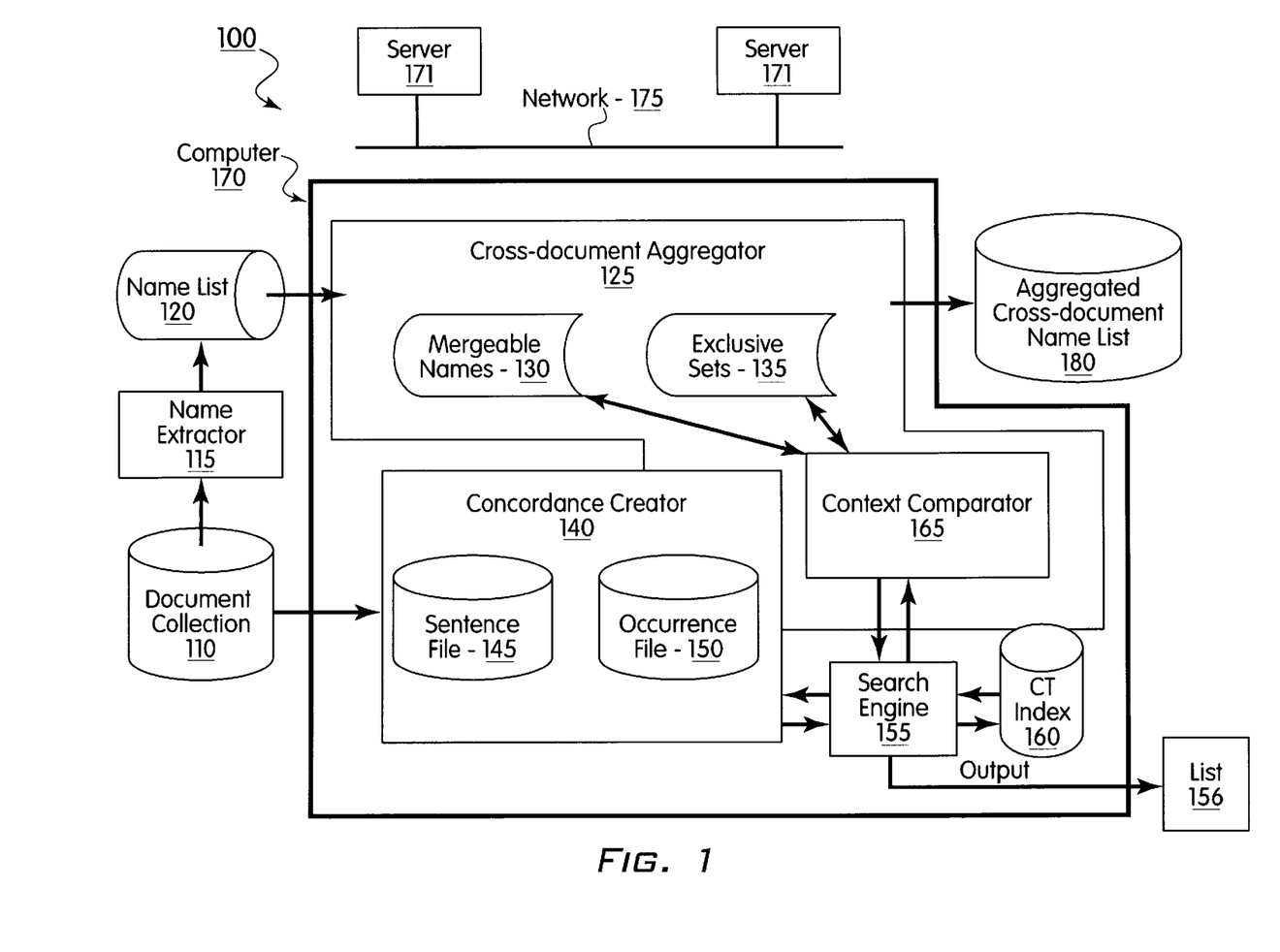
FIG. 1 is a block diagram of a system for cross-document coreferencing in accordance with the present invention.

It should be understood that the elements shown in FIGS. 1–5 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a system 100 for coreferencing two or more documents is illustratively shown. A document collection 110 is provided using at least two different documents to be coreferenced in accordance with the present invention. A name extractor 115 extracts names of entities, such as people, places and/or organizations, from collection 110 for one or more documents. One process which may be used with the present invention for name extraction is described in U.S. Pat. Nos. 5,819,265 and 5,832,480, commonly assigned to the assignee of the present invention and incorporated herein by reference. The name extractor 115 produces a list of names 120, or equivalence groups, for each document. The list 120 includes one or more of the following for each equivalence group:

1) a canonical string—the most explicit, least ambiguous string that serves as a label for the group;

2) a category which determines the entity type-person, place, organization, or other miscellaneous ones, such as reports, awards or prizes, etc. that the group refers to. If a category could not be established, the equivalence group is assigned the category "uncategorized";

3) a list of one or more variant names—other strings that were found in the document to refer to the same entity; frequency of occurrence of the canonical string and variants in the document;

various other features if identified. For example, if the category is person, the equivalence group is also associated with the gender (male or female), first name, middle name, last name, etc.

Since name extractor 115 includes linguistic heuristics without world knowledge about the entities mentioned in the documents and without recourse to an a prior list of known names or entities, name extractor 115 stipulates more equivalence groups than there are entities discussed in the document collection 110. In this invention, a cross document aggregation system 125 is included that processes the equivalence groups in list 120 using all the evidence that is accumulated when name extractor 115 has concluded. The cross document aggregator 125 reduces the number of equivalence groups in list 120. Its output is an aggregated and improved cross-document name list 180.

Figure 2:
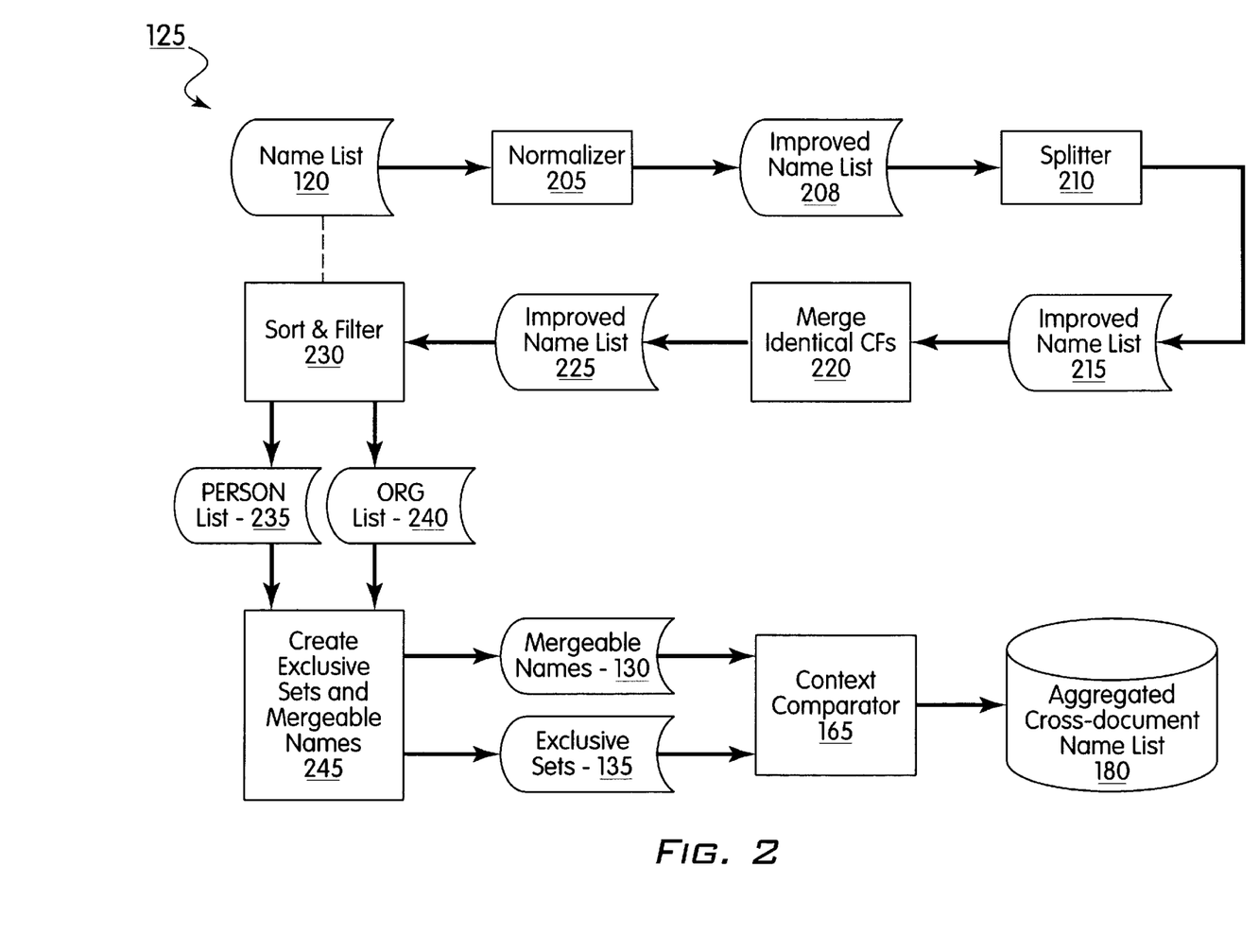
FIG. 2 is a flow diagram of a method for cross-document coreferencing in accordance with the present invention.

Referring to FIGS. 1 and 2, the cross document aggregator 125 includes one or more of the following elements. These elements may all be used together or portions used to perform certain tasks, for example merging strings to improve a name list. A splitter 210 may be included to identify composite canonical strings (i.e., strings which include two or more component names and should be split into their components). The splitter 210 splits these canonical strings into their component names and creates new equivalence groups for each component if none exists in list 120. The splitter 210 may also merge the split component names, their variants and frequency of occurrences with existing equivalence groups in list 120. The result is an improved name list 215.

Merging based on comparing certain features of compatible equivalence groups may be performed in a plurality of ways. A normalizer 205 receives canonical strings from the name list 120 and normalizes the strings over hyphens, spaces etc. as described above. The normalizer 205 merges equivalence groups that have identical normalized canonical strings and also identical categories. The result is an improved name list 208. The normalizer 205, splitter 210 and/or merger 220 may be used in conjunction with or in addition to one or more of the normalizer 205, splitter 210 and/or merger 220 (and vice versa) depending on the circumstances for coreferencing the documents in collection 110.

Merging of equivalence groups that have identical (normalized) canonical strings and compatible categories is performed by a merger 220. The result is an improved name list 225. Merging based on comparing the contexts in which compatible equivalence groups occur may now be performed. In block 230, filtering of the list 120, or any of the improved lists 208, 215 or 225, into two (or more) sorted lists is performed. In one embodiment, the sorted lists may include a list of person names 235 and a list of organization names 240. Other lists for other categories may be employed and are contemplated by the present invention. The uncategorized names of lists 120, 208, 215 and/or 225 are added to each of the category lists, if they share any sub-strings in common. Within each list 235 and 240, the equivalence groups are sorted into sub-lists. For example, all members of a person sub-list share a common last name. All members of an organization sub-list share a common prefix. Within each sub-list, the members may be further sorted. In a person sub-list, for example, the least ambiguous names—the ones containing both a first name and a middle name—come first. They are followed by names with a first name and middle initial, followed by names with only a first name, followed by names with only a first initial and finally names with just a last name.

In block 245, exclusive sets 135 and mergable names 130 are created within each sub-list, based on their features. Exclusive sets 135 are mutually incompatible—although they have the same last name, or same organization prefix, other features (such as opposite gender, or incompatible first names) prevent them from merging with each other. Block 245 includes a method for computing name compatibility based on the names to be compared. The mergable names 130, by contrast, are compatible with the exclusive sets within the same sub-list and could merge with one or more of these. The creation of sub-lists and of exclusive sets 135 and mergable names 130 within the sub-lists advantageously reduces the number of context comparisons needed. Since context comparisons are costly, this reduction is significant.

A context comparator 165 is included for comparison of the contexts of occurrence of each of the exclusive sets 135 with each of the mergable names 130 within a sub-list to determine whether the contexts are similar enough for merging the two. If they are, the mergable name 130 being considered is merged with the relevant exclusive set 135. The result is a merged (or aggregated) cross-document name list 180.

The context comparator 165 may be employed in conjunction with a concordance creator 140, a search engine 155 and a context thesaurus index 160. The concordance creator 140 processes the entire document collection, or a sufficient portion of it, and collects the contexts in which each name occurs, in two files, the sentence file 145 and the occurrence file, 150. A context for a name is defined as the sentence in which it occurs plus n sentences within the same paragraph that surround this sentence. n is controlled by a parameter. File 145 includes all the sentences that appear in any of the name contexts. File 150 includes the name and a pointer to all the sentences that appear in all its contexts. These contexts are then processed by the search engine 155 to produce the context thesaurus index 160 as follows. Pseudo-documents are created for each name. A pseudo-document includes all the context sentences for a name and has the name as its title. The pseudo documents are indexed by the search engine 155 to produce index 160. When a query is issued, it is matched against the pseudo documents in the index 160 and a ranked list 156 of pseudo documents most similar to the query is returned.

The search engine 155 provides a user with the capability of searching documents having variant names for a single entity. A search may be conducted by querying system 100 with a request for documents including an entity name. Document collection 110 is searched and names extracted by extractor 115 to form a name list 120. Cross-document aggregator 125 is employed to determine all variant names in accordance with a match threshold which may be entered by the user, be a default value or be set by other means. Search engine 155 then takes the output of aggregator 125 and searches the queried entity name as well as the variant names determined in accordance with the present invention. The search engine 155 then provides the user with a list of documents 156 pertinent to the query.

Referring again to FIG. 1, system 100 may include one or more computers 170 on which the cross-document aggregator 125 is employed. Computer 170 may be employed as a part of a network 175, such as a local area network, the Internet or other communications network including servers 171 or other communications computers or devices (e.g., personal digital assistants, etc.).

Figure 3:
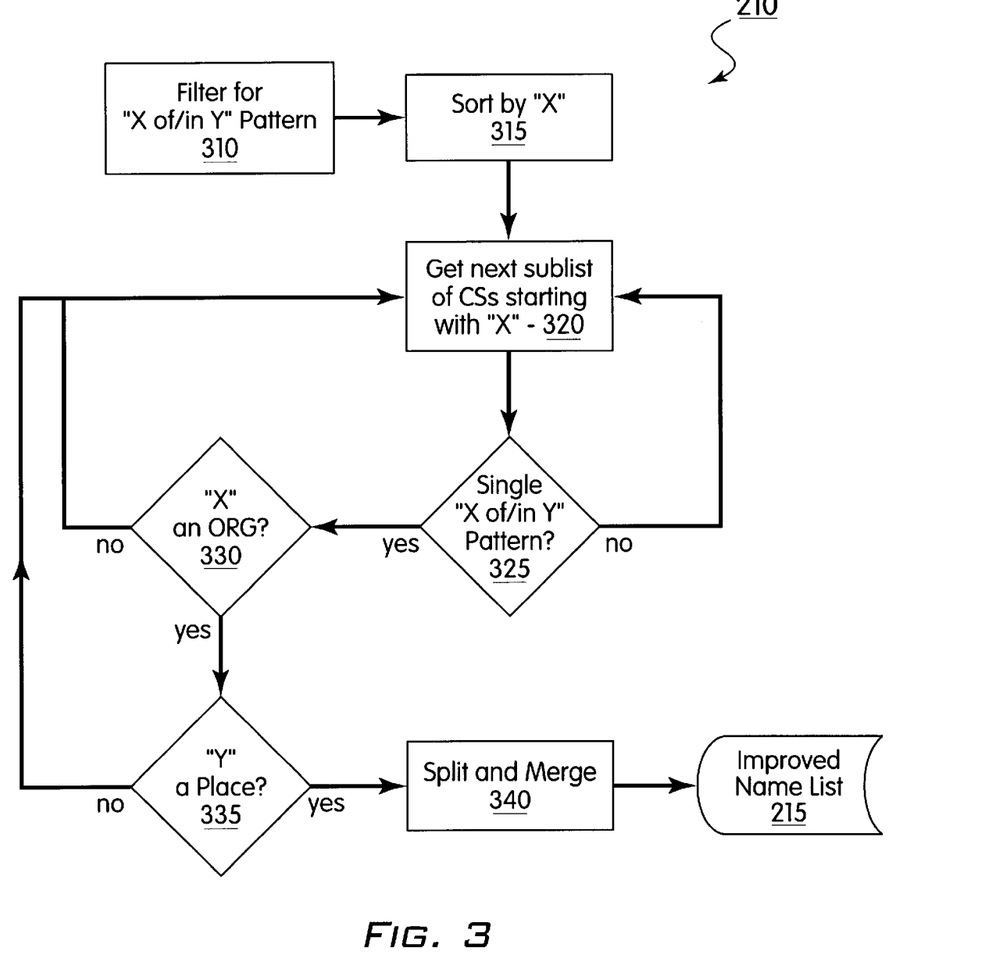
FIG. 3 is a flow diagram of a method for splitting names into categories in accordance with the present invention.

Referring to FIG. 3, the process of splitting as performed by the splitter 210 is described in greater detail. Equivalence groups with canonical strings of the pattern "X in Y" or "X of Y" are extracted from the name list 208 (or in some cases directly from list 120) by filter 310. The canonical strings are sorted in block 315 into sub-lists with the same "X" prefix— the string preceding "in" or "of". Sub-lists that include more than one equivalence group are not processed any further. In block 325, it is determined if the sub-list includes only one equivalence group; and in block 330, it is determined whether the prefix is the same as the canonical string of a known organization equivalence group in the name list. Then, in block 325, it is determined if the "Y" suffix is the same as the canonical string of a known place equivalence group in the name list. If there is an affirmation response in all of blocks 325, 330 and 335, then the canonical name is split in block 340 and its components merged with the organization equivalence group and the place equivalence group, respectively. If there is a negative response in any of blocks 325, 330 and 335, then the next sublist of canonical strings (CSs) is retrieved in block 320 and processing is continued. The result is improved name list 215.

Figure 4:
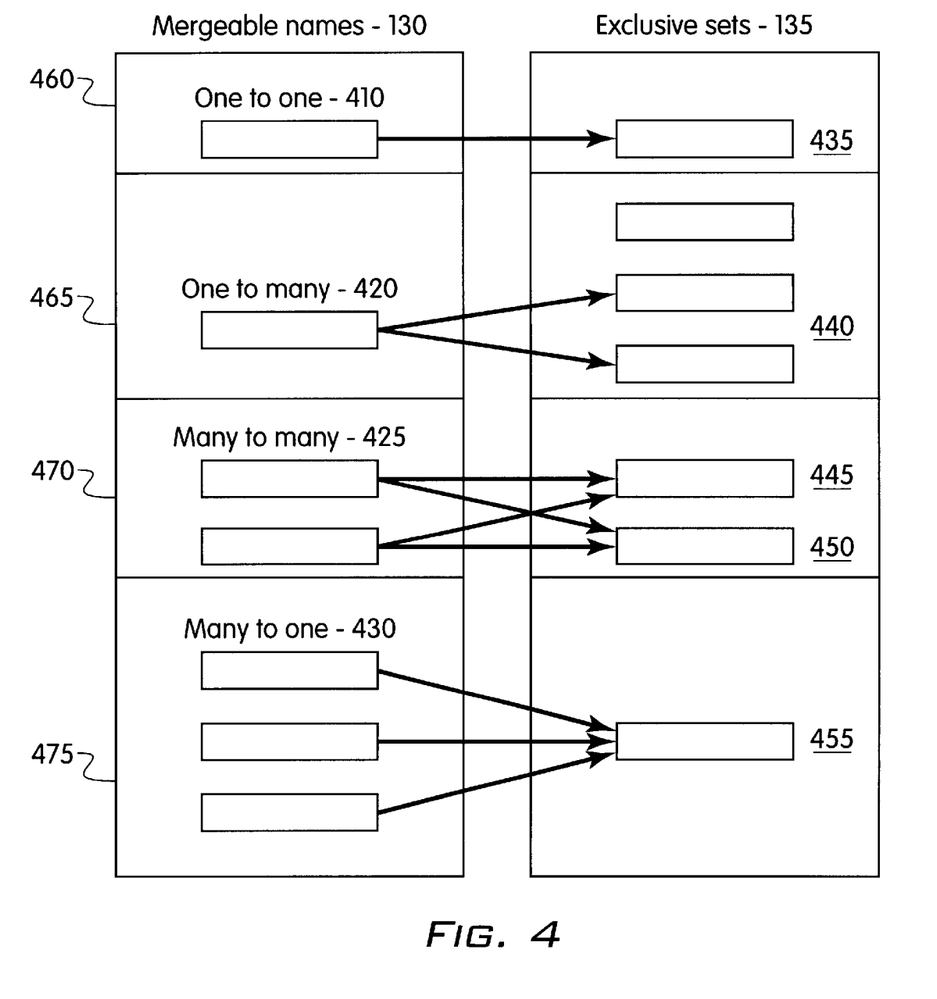
FIG. 4 is a block diagram showing mergable name structures and exclusive set structures in accordance with the present invention.

Referring to FIG. 4, an illustrative example of name data structures is represented. The mergable name data structures 130 and the exclusive set data structures 135 are shown. A sub-list 460 exemplifies a one-to-one mapping. Sub-list 460 includes one mergable name 410 and one exclusive set 435.

A sub-list 465 exemplifies a one-to-many mapping and includes one mergable name 420 and two or more exclusive sets 440. A sub-list 470 exemplifies a many-to-many mapping and includes two or more mergable names 425 and two or more exclusive sets 445 and 450. A sub-list 475 exemplifies a many-to-one mapping and includes two or more mergable names 430 and one exclusive set 455.

All mergable names are compared to all the exclusive sets within each sub-list. The best matches, if they exceed a minimal threshold, indicate a good merge. The minimal threshold is adjustable by a user, or may include a default value.

Figure 5:
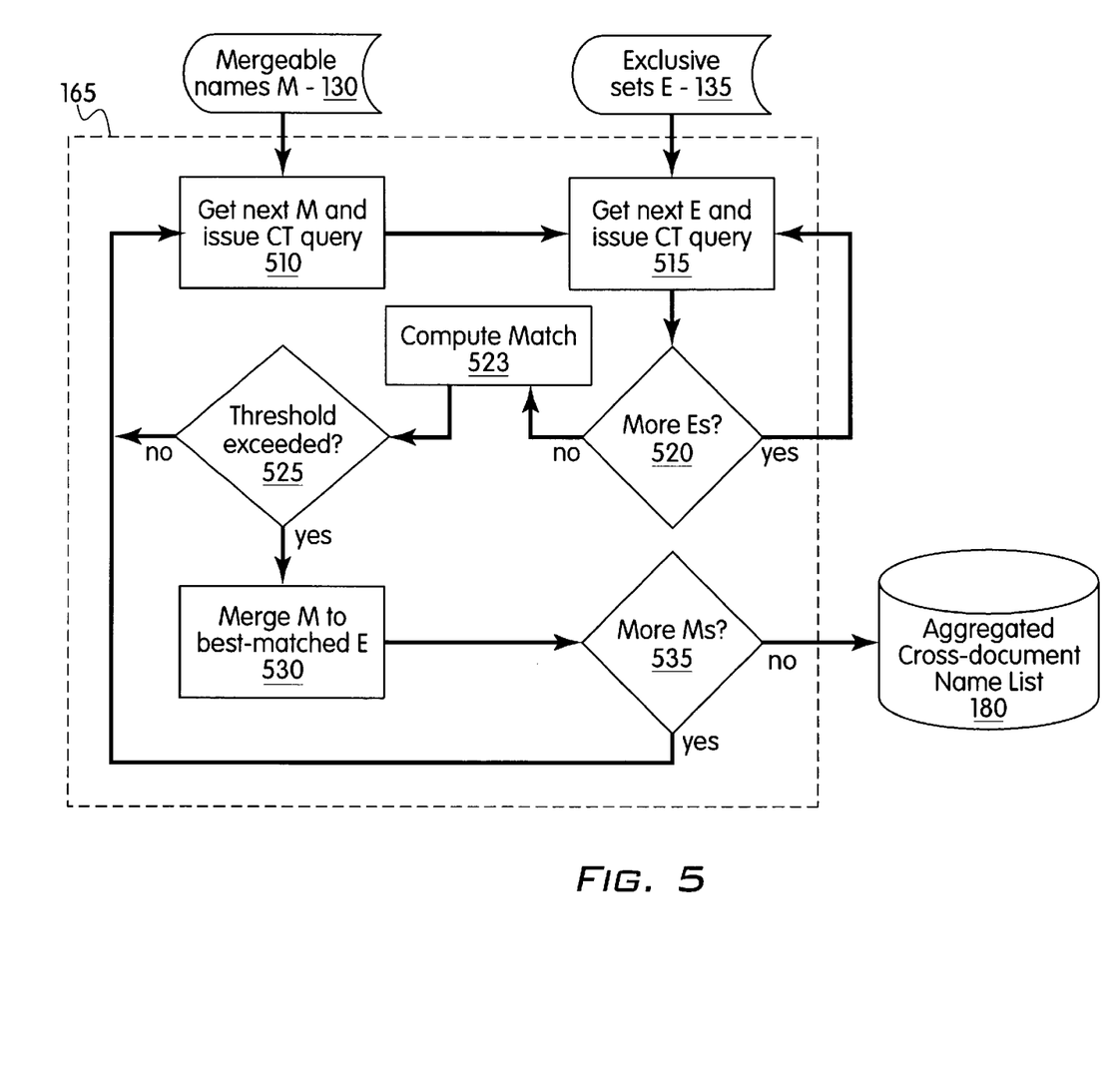
FIG. 5 is a block diagram showing a context comparator in accordance with the present invention.

Referring to FIG. 5, context comparison in accordance with the present invention is illustratively shown. Mergable names (M) 130 and exclusive sets (E) 135 are provided. A context thesaurus query (see above for this process) is issued for each mergable name (M) in block 510 and a list of n terms is obtained which most often co-occur with the mergable name in the collection of documents from block 535. The value of n is a variable parameter. A context thesaurus query is issued for each of the canonical forms of the exclusive sets (E) in block 515, a list of terms that co-occur with query are obtained in block 520. The term list for each mergable name (M) is compared with the term list for each exclusive set (E), and a match is computed in block 523. The match is based on the number of terms the two lists of co-occurring terms shared. If they fail to share a minimum number of common terms, as specified in a threshold, there is no match and no merge occurs as determined in block 525. If the threshold is exceeded, the mergable name will merge with the exclusive set it matched best in block 530. The method continues until all mergable names and exclusive set are exhausted. The results are stored in the aggregated cross-document name list 180.

The correct identification of the entities discussed in text has application in information retrieval systems, digital libraries and knowledge management systems. In information retrieval systems, users typically express their information need in a query composed of words. Very often, the queries mention names. Important people and places are often the subject of interest. The present invention permits for an improved and more accurate mapping between the names mentioned in the query and the named entities the user is interested in. A user interface may offer the user a choice of named entities, if the query is ambiguous. For example, if the query is "Clinton", the system can respond with "person or place?" Further narrowing within the category is also possible. When the user has made an unambiguous choice, only the documents that mention the unambiguous entity will be returned. Correct identification of named entities across documents can also help in a search that includes the function of "more like this"—when a user chooses a document discussing a person, place or organization, other documents discussing the same entity can be retrieved. In knowledge management systems that provide links among documents and between the documents and the larger context of information, documents discussing the same entities can be linked to each other and to other sources of information such as gazetteers, directories, organization charts, etc. Digital Libraries contain vast collections of documents and there is often a need to categorize and group them by content. Users can then navigate a conceptual map (a taxonomy, or hierarchy) of the document space instead of having to formulate queries. The present invention can be used for automatic categorization of documents, as it identifies all the documents that mention a particular named entity, so that they can be grouped together.

The distribution of distinct entities (or exclusive names) and mergable names varies significantly from one sorted group to another. On one hand, there are the "famous" entities, such as President Bush (see below). These tend to have at least one exclusive name with a high number of occurrences. There are quite a few mergable names, e.g., a famous entity is assumed to be part of the reader's general knowledge and is therefore not always fully and formally introduced, and a careful context comparison is usually needed. On the other end of the scale, there are the non-famous entities. There may be a great number of exclusive names, especially for common last names but the frequency of occurrences is relatively low. There are 68 members in the sorted group for "Anderson" and 7 is the highest number of occurrences. Expensive processing may not be justified for low-frequency exclusive names. It seems a tradeoff can be established between processing cost versus overall accuracy gain and it can be decided ahead of time how much disambiguation processing is needed for a given application.

Having described preferred embodiments of a system and method for cross-document coreference(which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for coreferencing a plurality of documents comprising the steps of:

providing a name list for names extracted from documents to be coreferenced prior to or upon entry of a query by a user;

placing each name of the name list into canonical form;

sorting the names of the name list into mergable names and exclusive sets;

comparing contexts of the mergable names against the exclusive sets to merge the mergable names to the exclusive sets which exceed a predetermined threshold to form an aggregated cross-document name list; and referencing the aggregated cross-document name list to provide the user with coreferenced names across the plurality of documents which refer to a same entity in accordance with the query.

2. The method as recited in claim 1, further comprising the step of extracting the name list from a collection of documents by employing a name extractor.

3. The method as recited in claim 1, further comprising the step of normalizing the name list to provide the names in the name list in a predetermined format.

4. The method as recited in claim 1, further comprising the step of splitting the names of the name list into component names based on evidence derived from the names.

5. The method as recited in claim 4, wherein the evidence derived from the names includes one of prefixes, suffixes, titles and information indicating one of a place, organization and a person.

6. The method as recited in claim 1, further comprising the step of merging identical names to reduce the name list.

7. The method as recited in claim 1, further comprising the step of sorting the name list into a person list and a place list.

8. The method as recited in claim 1, wherein the step of comparing contexts of the mergable names against the exclusive sets includes the steps of mapping all of the mergable names to each of the exclusive sets to provide matches above the predetermined threshold.

9. A program storage device readable by machine, tangibly embodying a program of instructions executable by the machine to perform method steps for coreferencing a plurality of documents, the method steps comprising:

providing a name list for names extracted from documents to be coreferenced;

placing each name of the name list into canonical form;

sorting the names of the name list into mergable names and exclusive sets; and comparing contexts of the mergable names against the exclusive sets to merge the mergable names to the exclusive sets which exceed a predetermined threshold to form an aggregated cross-document name list for the names in the name list.

10. The program storage device as recited in claim 9, further comprises the step of referencing the aggregated cross-document name list to provide a user with coreferenced names across the plurality of documents which refer to a same entity in accordance with a query input by the user.

11. The program storage device as recited in claim 9, further comprising the step of extracting the name list from a collection of documents by employing a name extractor.

12. The program storage device as recited in claim 9, further comprising the step of normalizing the name list to provide the names in the name list in a predetermined format.

13. The program storage device as recited in claim 9, further comprising the step of splitting the names of the name list into component names based on evidence derived from the names.

14. The program storage device as recited in claim 13, wherein the evidence derived from the names includes one of prefixes, suffixes, titles and information indicating one of a place, organization and a person.

15. The program storage device as recited in claim 9, further comprising the step of merging identical names to reduce the name list.

16. The program storage device as recited in claim 9, further comprising the step of sorting the name list into a person list and a place list.

17. The program storage device as recited in claim 9, wherein the step of comparing contexts of the mergable names against the exclusive sets includes the steps of mapping all of the mergable names to each of the exclusive sets to provide matches above the predetermined threshold.

18. A method for searching a plurality of documents for an entity having a plurality of variant names comprising the steps of:

providing a name list for names extracted from documents to be coreferenced prior to or upon entry of a search query by a user including a name of the entity;

placing each name of the name list into canonical form;

sorting the names of the name list into mergable names and exclusive sets;

comparing contexts of the mergable names against the exclusive sets to merge the mergable names to the exclusive sets which exceed a predetermined threshold to form an aggregated cross-document name list, the aggregated cross-document name list including a list of variant names for the entity; and providing a list of documents to the user referencing the variant names and the name of the entity used for the search query.

19. The method as recited in claim 18, further comprising the step of extracting the name list from a collection of documents by employing a name extractor.

20. The method as recited in claim 18, further comprising the step of normalizing the name list to provide the names in the name list in a predetermined format.

21. The method as recited in claim 18, further comprising the step of splitting the names of the name list into component names based on evidence derived from the names.

22. The method as recited in claim 21, wherein the evidence derived from the names includes one of prefixes, suffixes, titles and information indicating one of a place, organization and a person.

23. The method as recited in claim 18, further comprising the step of merging identical names to reduce the name list.

24. The method as recited in claim 18, further comprising the step of sorting the name list into a person list and a place list.

25. The method as recited in claim 18, wherein the step of comparing contexts of the mergable names against the exclusive sets includes the steps of mapping all of the mergable names to each of the exclusive sets to provide matches above the predetermined threshold.

* * * * *